Sept. 29, 1942.  J. Z. HOYER  2,297,186
HYDROMETER
Filed Jan. 2, 1940
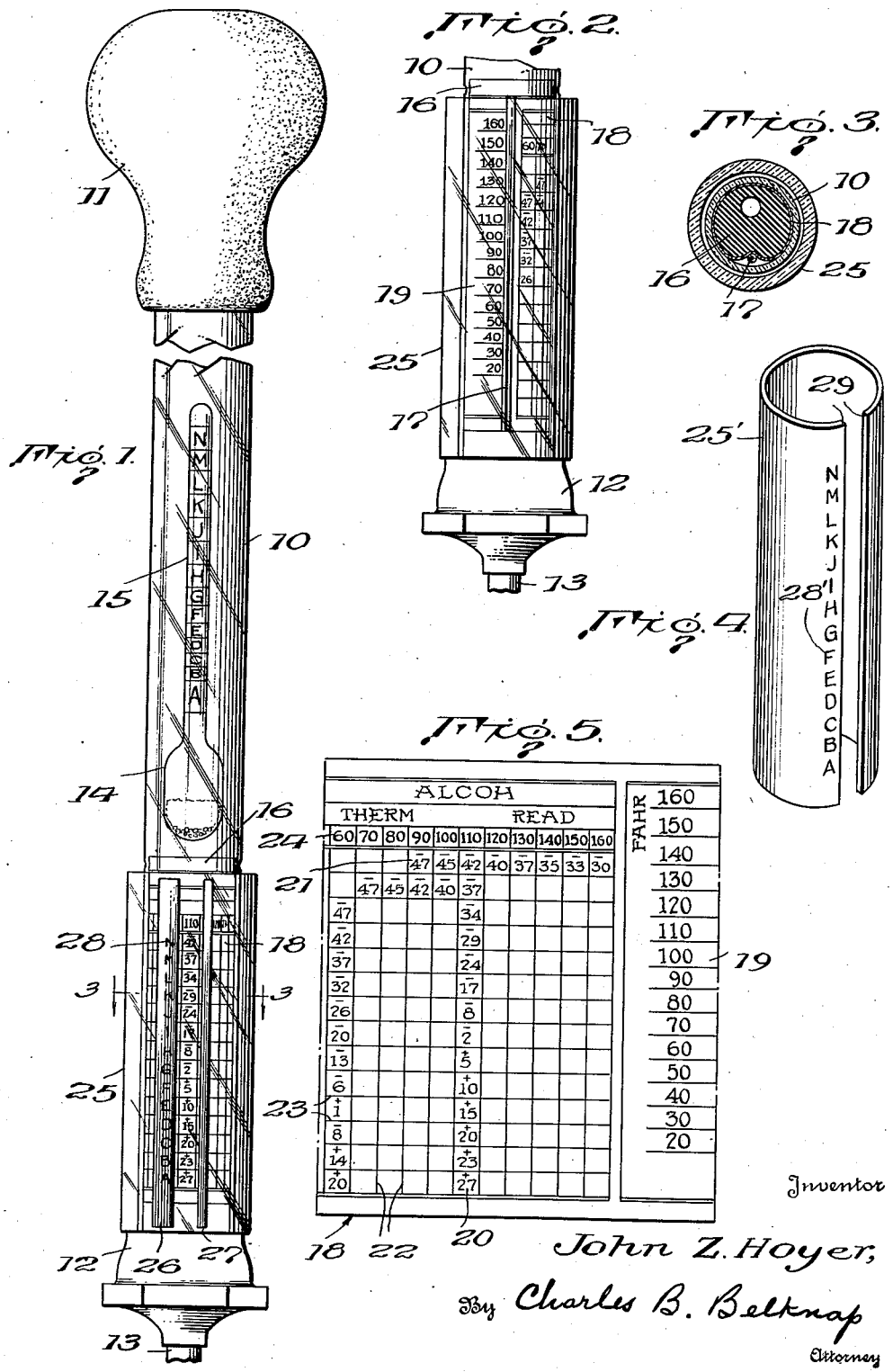
Inventor
John Z. Hoyer,
By Charles B. Belknap
Attorney Patented Sept. 29, 1942

2,297,186

UNITED STATES PATENT OFFICE 2,297,186

HYDROMETER

John Z. Hoyer, Conshohocken, Pa., assignor to Kimble Glass Company, Vineland, N. J., a corporation of Illinois Application January 2, 1940, Serial No. 312,124

4 Claims. (Cl. 265—46)

The present invention relates to hydrometers having thermometers combined therewith, and more particularly to a correction chart and cursor or finder therefor associated with the hydrometer.

Hydrometers for testing antifreeze solutions used in the radiators of automobiles frequently carry thermometers supported within the barrel of the hydrometer and having the bulb end of the thermometer in contact with the solution being tested. The hydrometer float is graduated to measure the specific gravity of the solution. Since the specific gravity of a solution will vary as its temperature changes, it is customary to employ correction charts from which can be determined the freezing point of the solution. Usually these charts comprise a series of vertical columns intersected by a series of horizontal columns forming a checker-like chart. One series of columns represent solution temperatures, while the other series represent specific gravities of the solution. The blocks formed by the intersecting lines contain indicia showing the freezing temperature of the solution when its temperature and specific gravity are known. The manner of reading these charts is first to note the temperature of the solution, then its specific gravity, after which one column of the chart is followed to the block formed by that column and the intersection therewith of the column corresponding to the other reading.

The present invention has for its main object the provision of a cursor movably mounted on the hydrometer and adjustable thereon to permit ready location of any column, the finder having thereon a column of indicia corresponding to the indicia on one of the measuring scales.

It is also one of the objects of this invention to provide a transparent sleeve mounted on the hydrometer barrel overlying the chart in the barrel and having thereon a column of indicia which can be moved into contiguous relation with any particular column on the chart.

Other objects will be apparent from the following description taken in connection with the accompanying drawing, in which—

Fig. 1 is a side elevation, partly broken, of a preferred form of the invention;

Fig. 2 is a fragmentary front elevation of the device shown in Fig. 1;

Fig. 3 is a section taken on line 3—3 of Fig. 1;

Fig. 4 is a perspective view of a modified form of a cursor; and

Fig. 5 is a plan view of the chart employed.

In the drawing, the hydrometer is shown as comprising the usual transparent glass barrel 10, rubber suction bulb 11, apertured end closure 12, and suction tip 13. Within the barrel is the float 14 having thereon one or more specific gravity scales as indicated at 15. Fitting tightly within the barrel 10 is an elongated plug 16 of the type illustrated in the patent to McClure No. 2,127,065, dated August 16, 1938, this plug accommodating a thermometer 17, the temperature indicating portion of which is disposed within and close to the wall of the barrel so that it may be readily seen through the barrel.

Extending circumferentially around the plug is a chart 18, the edges of which are spaced apart a short distance so that the thermometer will not be obscured. Adjacent one edge of the chart is a temperature scale 19 which, when the chart is in position, is disposed immediately to one side of the thermometer and indicates the temperatures of solutions tested by the hydrometer. The chart also includes a plurality of vertical and horizontal series of figures, shown at 20, 21, these figures representing freezing temperatures determined from calculations where the specific gravity and temperature of the solution are known. If desired the columns may be defined by intersecting vertical and horizontal lines 22, 23, forming blocks in which the figures are printed. At the top of the chart is a horizontal column 24 of figures each representing the temperature corresponding to the calculated data in a vertical column.

As shown in Figs. 1, 2, and 3, there is concentrically mounted on the hydrometer barrel a cylindrical transparent sleeve 25 which is adapted to be rotated on the barrel. The lower edge of the sleeve rests on the closure 12, thereby positioning the sleeve with respect to the chart in the barrel. Preferably two opaque vertical stripes 26, 27 are formed on the sleeve either by burning in a color, by frosting, or by some other suitable method. The stripes are spaced a distance approximately equal to the distance between two adjacent vertical lines on the chart, thus permitting only one vertical column on the chart to be seen. A vertical column of indicia 28 similar to that on the specific gravity scale 15 is placed on one of the stripes, these indicia being aligned with the horizontal columns on the chart.

The manner of using the cursor is evident. After having determined the specific gravity of the solution being tested by reference to the scale 15 on the float, and the temperature of the solution from scale 19, the sleeve is rotated to bring the column corresponding to the temperature reading into underlying relation with the space between the stripes. Then, knowing the specific gravity, the figure opposite the letter corresponding to that specific gravity is taken, this figure being a calculated determination of the freezing point of the solution. Thus it will be seen that ready reference to the data on the chart may be had without having to follow the columns with the eye, this latter procedure being the one now commonly employed and being subject to frequent errors.

A modified form of the device is shown in Fig. 4 wherein the C-shaped sleeve 25' surrounds the barrel and may be made of metal, molded plastic, or other suitable material. In this form of the invention the sleeve is opaque and the longitudinal edges 29 are spaced apart a distance equal to the width of one of the vertical columns of the chart. A column of indicia 28' corresponding to that on the float scale is stamped or otherwise formed on the sleeve adjacent one of its longitudinal edges. This form of cursor is operated in the same manner as that employed with the transparent sleeve.

While a preferred embodiment of the invention has been illustrated and described, it is not intended that it be limited to the exact details shown. It is possible, for instance, to omit the opaque stripes and have the indicia on the sleeve sufficiently distinct to obviate undue confusion with data lying thereunder, the column at the same time serving as a guide. The arrangement of temperature and specific gravity figures may also be such that temperatures correspond to the horizontal columns and specific gravities to the vertical series. The sleeve would be modified accordingly. For this reason the claims are to be construed as applicable to the various modifications to which the relative arrangement of the chart and cursor are adapted.

What I claim is:

1. In combination with a hydrometer having a transparent barrel and a float therein, said float having a specific gravity scale thereon, a thermometer in said barrel, a temperature scale adjacent said thermometer and disposed in predetermined relation to the thermometer, an arcuate chart mounted concentrically on said barrel and having thereon figures arranged in vertical and horizontal series, said figures representing freezing points of the solution being tested, one of said series corresponding to temperatures of the solution as indicated by said thermometer scale, the other of the series corresponding to specific gravities of the solution as indicated by said float scale, and a curved sleeve on said barrel mounted for movement relative to said chart, said sleeve being positioned in the zone of said thermometer below the hydrometer scale and having an opaque portion the edge of which is parallel with one of said series, the figures on said chart being visible through said sleeve adjacent said portion, said portion having thereon indicia similar to the indicia on one of said scales and adjacent said edge.

2. In combination with a hydrometer having a transparent barrel and a float therein, said float having a specific gravity scale thereon, a thermometer in said barrel, a temperature scale adjacent said thermometer and disposed in predetermined relation to the thermometer, a chart associated with said barrel and having thereon figures arranged in vertical and horizontal series, said figures representing freezing points of the solution being tested, said chart being disposed contiguous to the inner wall of the barrel, the vertical series corresponding to temperatures of the solution as indicated by said thermometer scale, the horizontal series corresponding to specific gravities of the solution as indicated by said float scale, and a cylindrical transparent sleeve surrounding a portion of said barrel in the zone of said thermometer below said hydrometer scale and rotatable thereon, said sleeve having thereon an opaque stripe parallel to the axis of the barrel, said stripe having thereon a vertical column of indicia similar to the indicia on the float scale and aligned with said horizontal series of figures.

3. In combination with a hydrometer having a transparent barrel and a float therein, said float having a specific gravity scale thereon, a thermometer in said barrel, a temperature scale adjacent said thermometer and disposed in predetermined relation to the thermometer, a chart associated with said barrel and having thereon figures arranged in vertical and horizontal series, said figures representing freezing points of the solution being tested, said chart being disposed contiguous to the inner wall of the barrel, the vertical series corresponding to temperatures of the solution as indicated by said thermometer scale, the horizontal series corresponding to specific gravities of the solution as indicated by said float scale, and a cylindrical transparent sleeve surrounding a portion of said barrel, said sleeve being rotatable on the barrel in the zone of said thermometer below said hydrometer scale and having thereon a vertical column of indicia similar to the indicia on the float scale and aligned with said horizontal series of figures.

4. In combination with a hydrometer having a transparent barrel and a float therein, said float having a specific gravity scale thereon, a thermometer in said barrel, a temperature scale adjacent said thermometer and disposed in predetermined relation to the thermometer, a chart associated with said barrel and having thereon figures arranged in vertical and horizontal series, said figures representing freezing points of the solution being tested, said chart being disposed contiguous to the inner wall of the barrel, the vertical series corresponding to temperatures of the solution as indicated by said thermometer scale, the horizontal series corresponding to specific gravities of the solution as indicated by said float scale, and a cylindrical transparent sleeve surrounding a portion of the barrel, said sleeve being rotatable on the barrrel in the zone of said thermometer below said hydrometer scale and having thereon a pair of opaque stripes spaced apart a distance equal to the width of one of the vertical series of figures, one of said stripes having thereon a vertical column of indicia similar to the indicia on the float scale and aligned with said horizontal series of figures.

JOHN Z. HOYER.